J. B. VON CANON.
SELF LOADING VEHICLE.
APPLICATION FILED MAY 4, 1920.
1,397,994.
Patented Nov. 22, 1921.
3 SHEETS—SHEET 1.
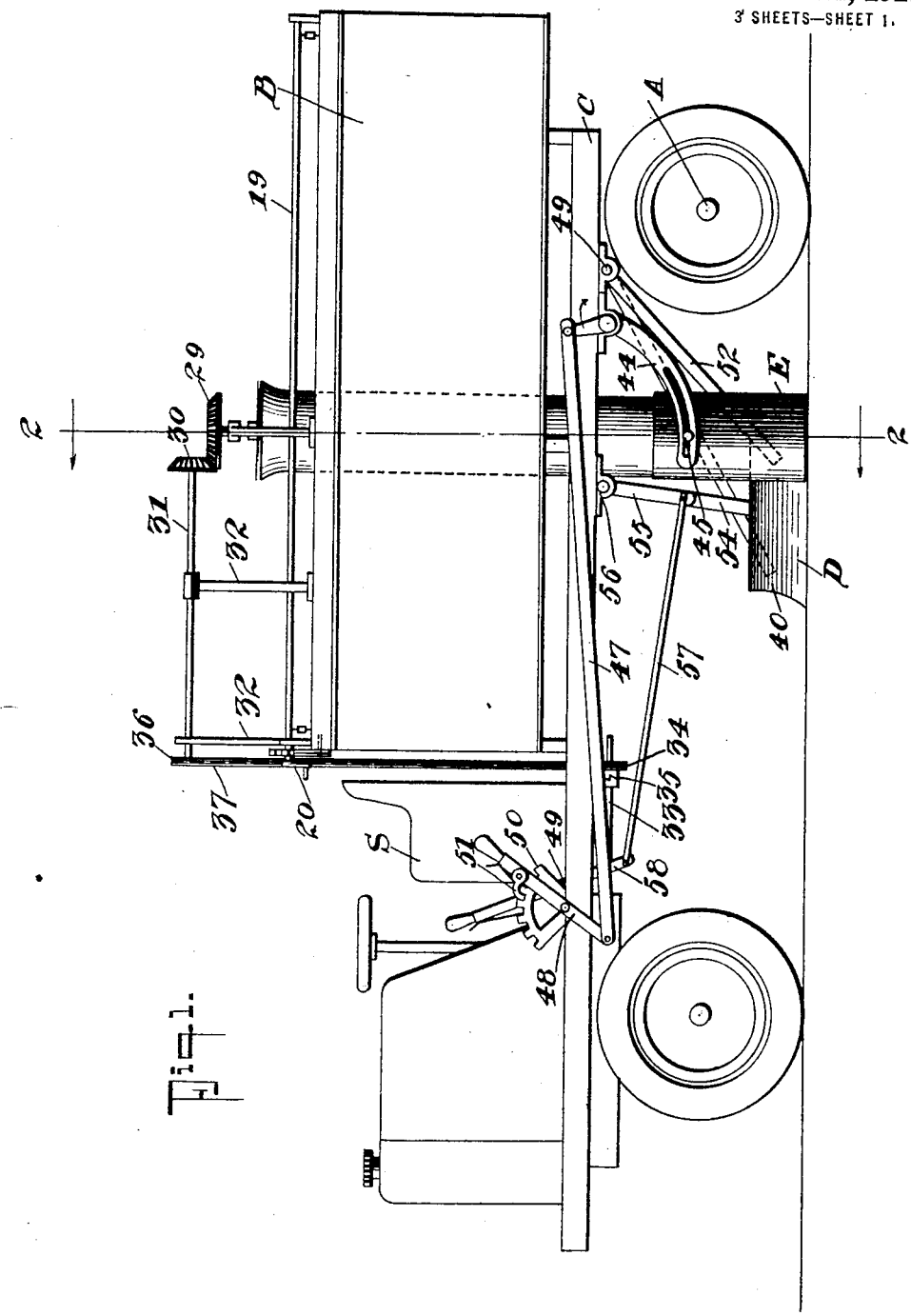
WITNESSES
Geo. V. Hall
C. B. Jones
INVENTOR
J. B. Von Canon.
BY
Munn & Co
ATTORNEYS

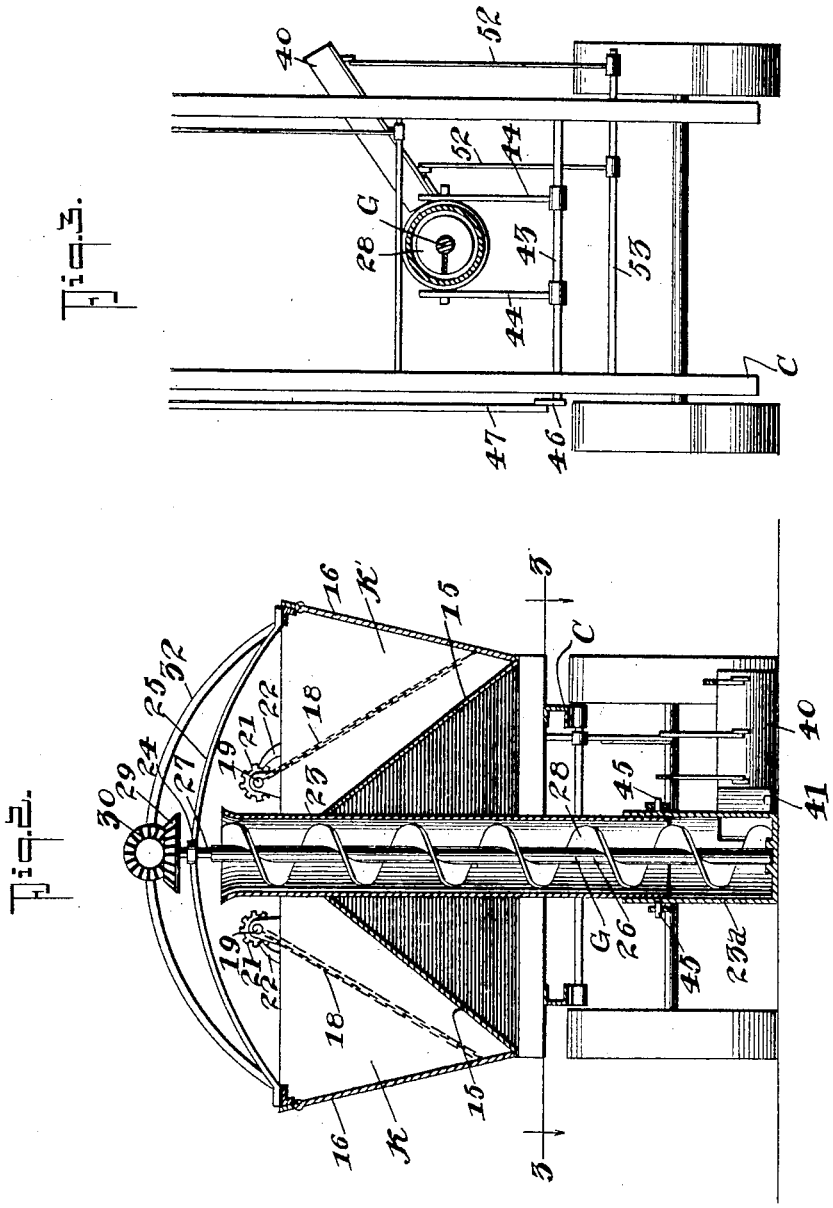

J. B. VON CANON.
SELF LOADING VEHICLE.
APPLICATION FILED MAY 4, 1920.
1,397,994.
Patented Nov. 22, 1921.
3 SHEETS—SHEET 3.
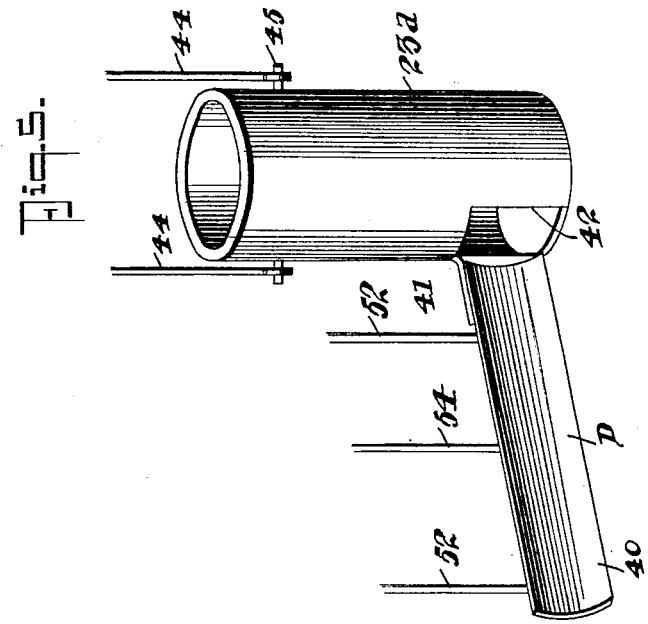
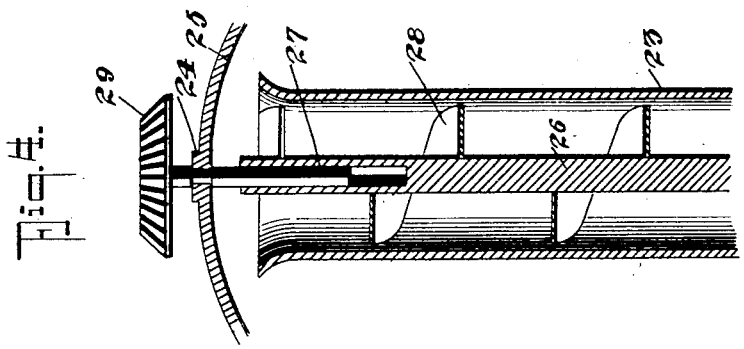
WITNESSES
INVENTOR
J. B. Von Canon.
BY
ATTORNEYS

UNITED STATES PATENT OFFICE.

JAMES BOBBIT VON CANON, OF WEST END, NORTH CAROLINA.

SELF-LOADING VEHICLE.

1,397,994.  Specification of Letters Patent.  Patented Nov. 22, 1921.

Application filed May 4, 1920. Serial No. 378,744.

*To all whom it may concern:*

Be it known that I, JAMES BOBBIT VON CANON, a citizen of the United States, and a resident of West End, in the county of Moore and State of North Carolina, have invented certain new and useful Improvements in Self-Loading Vehicles, of which the following is a specification.

My invention relates to self-loading vehicles, and particularly to a loading apparatus of the type embodied in my co-pending application, Serial Number 365,285, filed March 12, 1920.

A purpose of my invention is the provision of a loading apparatus designed to be applied to a motor truck of the standard construction and comprising a vehicle body, a concentrating device consisting of a single wing or blade that extends from the side of the vehicle to allow of the collecting of material at one side of the vehicle and concentrating the same beneath the vehicle, and a spiral conveyer for delivering such material into the body.

I will describe one form of vehicle and one form of loading apparatus embodying my invention, and will then point out the novel features thereof in claims.

In the drawings:

Figure 1 is a view showing in side elevation one form of vehicle having applied thereto one form of loading apparatus embodying my invention.

Fig. 2 is a vertical sectional view taken on the line 2—2 of Fig. 1.

Fig. 3 is a horizontal sectional view taken on the line 3—3 of Fig. 2.

Fig. 4 is a fragmentary vertical sectional view of a portion of the conveyer shown in the preceding views.

Fig. 5 is an enlarged detail perspective view of the concentrating device, and an adjacent portion of the conveyer.

Similar reference characters refer to similar parts in each of the several views.

Referring specifically to the drawings and particularly to Figs. 1 and 2, I have here shown a motor truck of the form shown in my co-pending application, and in which C designates the chassis, A the rear axle and S the operator's seat.

The loading apparatus forming the subject matter of my invention comprises a body designated generally at B which is identical in construction to the body of the loading apparatus in my co-pending application in that it is formed into two separate and independent compartments K and K' which have oppositely inclined inner side walls 15 and doors 16 controlling the passage of material from the compartments and hingedly supported in such manner as to normally occupy an open position. As shown in Fig. 2, the doors 16 are secured in closed position by means of chains 18 which are connected to the doors in the manner shown and are trained around a pair of shafts 19 journaled in suitable bearing plates and extending the entire length of the vehicle body. In the present instance, each shaft 19 is operable independently of the other shaft so that one door 16 can be operated independently of the other to discharge the material from its corresponding compartment. This operation of each shaft 19 is effected by means of a hanger 20 secured to the forward end of the shaft, and at such end the shaft is provided with a ratchet wheel 21 engaged by a pawl 22 for effecting a locking of the shaft against rotation, as will be understood.

The material to be loaded into the body B is collected by a concentrating device designated generally at D. As shown in Figs. 1 and 2, the concentrating device is disposed below the body B and beneath the chassis C and when in its lowermost position is adapted to engage the ground beneath the vehicle so that during forward movement of the latter, the device will effect a concentration of the material to be loaded at the lower end of an elevating or conveying device designated at E. The elevating device in turn elevates the material to a point above the body B where it is ultimately admitted into the compartments K and K'.

As illustrated to advantage in Figs. 1, 2, and 4, the elevating device comprises a tubular casing including a stationary section 23 and a movable section 23ª, the former extending through the walls 15 of the vehicle body and having its upper end disposed above the body. The lower end of the section 23 is telescopically associated with the movable section 23ª, the latter resting upon the ground in its normal active position. Arranged within and extending longitudinally of the tubular casing is a shaft G, the lower end of which is journaled in the lower end wall of the movable section 23ª, while the upper end thereof is journaled in a bearing 24 fixed to a brace bar 25 supported upon the body B in the manner shown in Fig. 2. As illustrated to advantage in Fig. 4, the shaft G comprises a movable section 26 and a stationary section 27. The upper end of the movable shaft section 26 is bored longitudinally for a portion of its length to slidably receive the adjacent end of the movable shaft section 27 it being noted that the bore of the section 26 and the adjacent end of the shaft section 27 are of angular contour in cross section so that a driving connection between the two is at all times maintained irrespective of the adjustment of the section 26. The shaft section 26 rigidly supports a spirally formed blade 28 which when rotating in the proper direction effects an elevation of a material vertically within the tubular casing. The shaft G is adapted to be rotated to effect an actuation of the blade 28 by means of a beveled gear 29 which is fixed to the upper end of the shaft section 27. The gear 29 meshes with a similar gear 30 fixed to the rear end of a shaft 31 journaled in standards 32 supported upon the vehicle body. The forward end of the shaft 31 is operatively connected to the engine of the vehicle through the following mechanism: As shown in Fig. 1, the shaft of the engine is extended rearwardly as indicated at 33, and is provided with a sprocket 34 which is adapted to be operatively connected to the shaft by a clutch 35. The sprocket 34 is in turn connected to a similar sprocket 36 fixed to the shaft 31 by a chain 37. It will be understood that the clutch 35 can be manually actuated to connect or disconnect the sprocket 34 to or from the shaft 33 to control the driving of the shaft 31 and thus control the movement of the blade 28 of the elevating device.

As shown in Figs. 2 and 5, the concentrating device D comprises a single blade 40 curved transversely in the form of an arc and secured at one end to a laterally projecting arm 41 formed on the movable section 23ª of the elevating casing. As shown in Fig. 3, the blade 40 is of such a length as to have its free end projected beyond one side of the vehicle so as to effect the gathering or concentrating of the material to be loaded from a point at the side of the vehicle, as will be more clearly described hereinafter. The arm 41 constitutes an integral part of the movable section 23ª and as shown to advantage in Fig. 5, such arm constitutes an outstruck portion of the section thereby providing an opening 42 through which the material concentrated by the device D is introduced into the casing of the elevating device.

The movable section 23ª and the blade 40 of the concentrating device D are capable of vertical adjustment in order to move the same into active position when they contact with the material beneath the vehicle to effect a concentration of the material in the lower end of the elevating casing, or an inactive position in which they are elevated to a point where they escape the material beneath the vehicle so that a concentration of such material is not effected. To this end, I provide the following mechanism for the movable section 23ª: A shaft 43 is journaled in suitable bearings secured to the chassis C and fixed to this shaft are a pair of curved arms 44 which are slotted for a portion of their length as shown in Fig. 1 to receive pins 45 fixed at diametrically opposite points on the casing section 23ª as shown in Fig. 3. Closing one end of the shaft 43 is an arm 46 to which is pivotally connected a link 47. The link 47 in turn is connected to the lower end of an actuating lever 48 fulcrumed at a point indicated at 49 and adapted to be locked in any adjusted position by means of a quadrant 50 and a pawl 51. By this arrangement it will be seen that when the lever 8 is rocked about the point 49 as a center in one direction or the other, such movement is imparted to the shaft 43 through the link 47 and the arm 46 so as to effect an oscillation of the shaft to lower or elevate the arms 44. When the arms 44 are elevated, it will be clear that an elevation of the section casing 23ª is effected so as to telescope upon the movable section 23. In order to allow of this movement of the section 23, the telescopic connection between the movable shaft section 26 and the stationary shaft section 27 has been provided so that the section 26 can move upwardly with the casing 23ª while the shaft section 27 remains stationary so as to maintain a driving connection at all times between the gears 29 and 30.

For effecting an elevation or lowering of the concentrating device D, the following mechanism is provided: As illustrated to advantage in Figs. 3 and 5, two arms 52 are fixed at one of their ends to a shaft 53 journaled upon the chassis C. The opposite ends of the arms 52 are pivotally connected to the blade 40. As shown in Fig. 1, a link 54 is pivotally connected at its lower end to the blade 40 and at its upper end with the lower end of another link 55. The upper end of the link 55 is pivotally mounted in a suitable bearing 56 secured to the under side of the chassis C. Pivotally connected to the meeting ends of the links 54 and 55 is a rod 57, the latter in turn being pivotally connected to an actuating lever 58 which is also capable of being locked in any adjusted position in a manner similar to the lever 52.

With the blade 40 occupying its lowermost position as shown in Fig. 1, the links 54 and 55 are extended, and when it is desired to elevate the blade 40 out of contact with the material to be loaded, the lever 58 is moved in such direction as to advance the rod 57 and to thereby cause a breaking or folding of the links 54 and 55 thus causing the blade to swing upwardly about the shaft 53 as a center. It will be understood that by moving the lever 58 in the opposite direction, the actuation of the links 54 and 55 is effected to return the blade 40 to its lowermost position.

From the foregoing description taken in connection with the accompanying drawings, the operation of the loading mechanism will be readily understood from the following brief description:

As the vehicle advances over a quantity of material to be loaded, the concentrating device D will cause such material to move into the casing section 23ª through the opening 42 where it is engaged by the rotating blade 28 and thus carried upwardly of the elevating casing and ultimately through the upper end of the same into the compartments K and K' of the vehicle body. The spiral blade 28 provides a positive means for elevating the material, and is of a simple and inexpensive construction as compared to elevating devices embodied in my co-pending application. It is to be particularly noted that the free or outer end of the blade 40 projects beyond the side of the vehicle so that material at the same side of the vehicle can be engaged and ultimately fed to the elevating device. This arrangement is of great advantage when loading material at the side of road or in ditches where it is impossible for the vehicle to traverse in order that the material will be disposed directly beneath the vehicle. Because of the construction of the blade D it will be further noted that such blade may be utilized as a grader, the straight edge thereof making the device useful for scraping the surface of the road and for leveling down material that is being deposited upon the road. The material is ejected from the vehicle body by opening the doors 16 in a manner which will be readily understood so as to allow of the gravitation of the material to the opposite sides of the vehicle.

If the normal lowermost position of the elevating and concentrating device interferes with the progress of the vehicle over the material to be loaded, it will be clear that by the actuation of the levers 49 and 54, the device can be elevated to the desired height in order that the blade 40 may properly feed the material into the elevating casing. This change in adjustment of these devices in no way interferes with the normal operation of the blade 28, it being understood that the telescoping of the two shaft sections is effected when the casing section 23ª is elevated, but at the same time maintaining the driving connection between the two shaft sections, so that the blade 28 continues to revolve in elevating the material into the body B.

Although I have herein shown and described only one form of loading apparatus embodying my invention, it is to be understood that various changes and modifications may be made herein without departing from the spirit of the invention and the spirit and scope of the appended claims.

What I claim is:

1. A loading apparatus for motor vehicles comprising, a body, a concentrating device supported beneath the body and adapted to collect the material to be loaded, an elevating casing, comprising a stationary section and a movable section telescopically associated with the stationary section, a spiral conveyer within said casing, a shaft for actuating said conveyer comprising a stationary section and a movable section telescopically associated with the stationary section, means for driving the stationary section, and manually operable means for elevating the movable section of the casing and said concentrating device for the purpose described.

2. A loading apparatus for motor vehicles comprising, a body, a concentrating device supported beneath the body and adapted to collect the material to be loaded, an elevating casing, comprising a stationary section and a movable section telescopically associated with the stationary section, a spiral conveyer within said casing, a shaft for actuating said conveyer comprising a stationary section and a movable section telescopically associated with the stationary section, means for driving the stationary section, manually operable means for elevating the movable section of the casing and said concentrating device for the purpose described, said means comprising shafts, arms secured to said shafts and to said movable section and concentrating device, and levers operatively connected to said shafts for actuating the same.

3. A loading apparatus for motor vehicles comprising, a body, an extensible casing extending through the body and terminating at its upper end above the body, a spiral conveyer within said casing, an expansible shaft for supporting and driving said conveyer, and a blade extending radially from and in advance of said casing, for the purpose described.

4. A loading apparatus for motor vehicles comprising, a body, a casing extending through said body and having its upper end terminating above the body, said casing comprising a stationary section and a movable section telescopically associated with the lower end of the stationary section, and having an opening formed therein, pins carried by the movable section, slotted arms connected to said pins, a shaft for supporting said arms, a lever operatively connected to said shaft for rotating the same to effect elevating or lowering of said section, a spiral conveyer within said casing, a sectional shaft for supporting said conveyer and comprising telescopically associated sections, and a concentrating device extending radially from and in advance of the movable section at a point adjacent said opening.

5. A loading apparatus for motor vehicles comprising, a body, a casing extending through said body, and having its upper end terminating above the body, said casing comprising a stationary section and a movable section telescopically associated with the lower end of the stationary section, and having an opening formed therein, pins carried by the movable section, slotted arms connected to said pins, a shaft for supporting said arms, a lever operatively connected to said shaft for rotating the same to effect elevating or lowering of said section, a spiral conveyer within said casing, a sectional shaft for supporting said conveyer and comprising telescopically associated sections, a blade extending radially from and in advance of the movable section at a point adjacent said opening, means for pivotally supporting said blade and manually operable means for elevating said blade.

JAMES BOBBIT VON CANON.